United States Patent Office 3,357,996
Patented Dec. 12, 1967

3,357,996
SULFOLANE COMPOUNDS
Raymond L. Cobb, Bartlesville, Okla., assignor to Phillips Petroleum Company, a corporation of Delaware
No Drawing. Filed June 18, 1964, Ser. No. 376,210
5 Claims. (Cl. 260—332.1)

This invention relates to novel sulfolane compounds. In another aspect, it relates to a process for preparing such novel sulfolane compounds.

I have discovered that novel and useful sulfolane compounds of the general formula:

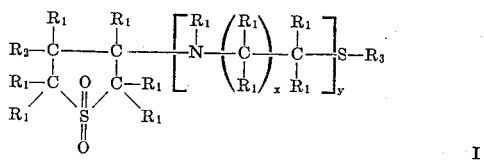

I can be prepared, according to one embodiment of this invention (where $y$ in Formula I is zero), by the reaction of a halosulfolane, or an alkylated derivative thereof, with Groups I, II or III metal thiosulfate of the general formula $MS_2O_3$ or with an alkali metal mercaptide of the general formula $M'SR_3$. Said halosulfolanes, and their alkylated derivatives, can be represented by the general formula:

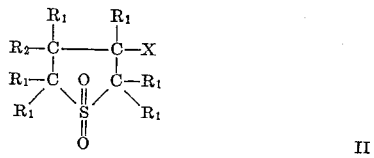

II

In another embodiment of this invention (where $y$ in Formula I is 1), the novel sulfolane compounds, represented by said general Formula I, can also be prepared by reaction of 3-sulfolene, or an alkylated derivative thereof, or 4-hydroxy-2-sulfolene, or alkylated derivatives thereof, with certain amino-substituted organic sulfides and thiosulfuric acids thereof. Said 3-sulfolene compound, and its alkylated derivatives, can be represented by the general formula:

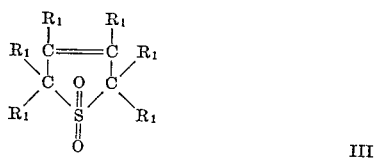

III

Said 4-hydroxy-2-sulfolene compound, and its alkylated derivatives, can be represented by the general formula:

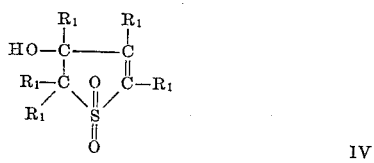

IV

Said amino-substituted organic sulfides, and thiosulfuric acids thereof, can be represented by the following general formula:

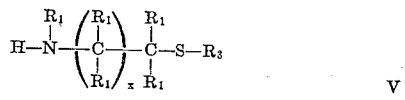

V

In the above general formulas, $R_1$ is selected from the group consisting of a hydrogen atom and methyl and ethyl radicals, $R_2$ is selected from the group consisting of the radicals $—N(R_1)_2$, $—O—R_1$, and $—R_1$ (where $R_1$ is as defined above), $R_3$ is selected from the group consisting of hydrocarbon radicals (preferably containing 1 to 10 carbon atoms each) such as alkyl, aryl, alkaryl, aralkyl and cycloalkyl radicals, $—SO_3H$, and the radical

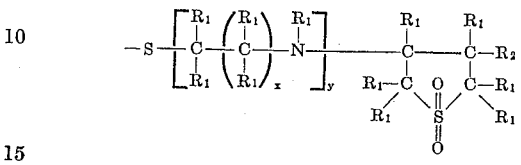

X is a halogen atom such as chlorine, bromine or iodine, $x$ is an integer of 1 or 2, $y$ is an integer of 0 or 1 with the proviso that where $y$ is zero $R_2$ is selected from the group consisting of $—N(R_1)_2$ and $—O—R_1$ (where $R_1$ is as defined above), M is a Group I, II or III metal (sodium, potassium, rubidium, cesium, lithium, calcium, strontium, barium, aluminum, thallium, gallium, and indium), and M' is an alkali metal (sodium, potassium, rubidium, cesium, and lithium).

Representative novel sulfolane compounds which can be prepared by the practice of this invention and coming within the scope of said general Formula I include:

3-amino-4-methylthiosulfolane,
3-hydroxy-4-ethylthiosulfolane,
3-methoxy-4-phenylthiosulfolane,
3-ethoxy-4-n-tolylthiosulfolane,
3-(2-[n-decylthio]-ethylamino)-4-methylamino-sulfolane,
3-(2-benzylthioethylamino)-4-diethylaminosulfolane,
3-(3-cyclohexylthiopropyl)amino-4-methylethyl-aminosulfolane,
2-ethyl-2-methyl-3-[3-(1,1-dioxotetrahydro-thienyl)amino]propanethiolsulfuric acid,
bis[3-amino-4(1,1-dioxotetrahydrothienyl)]disulfide,
bis[3-(1,1-dioxotetrahydrothienyl)amino-ethyl]disulfide,
bis 2-[4(1,1-dioxo-3-methyltetrahydrothienyl)amino-ethyl]disulfide,
3-amino-4-(3-dodecylthio-1,1,2,2,3-pentaethyl-pentyl)amino-2,2,3,4,5,5,$N_3$,$N_3$,$N_4$-nonaethyl-sulfolane,
3-amino-4-isobutylthio-2,3,4,5-tetramethylsulfolane,
3-(2,4-diethylphenylthio)-2,3,4,5-tetraethyl-4-sulfolanol,
2,5-diethyl-3-methoxy-4-(1-methyl-6-phenyl-3-thiahexyl)amino-2,5,N-trimethylsulfolane,
1-ethyl-[3-(1,1-dioxo-5-methyltetrahydro-thienyl)]-amino-2-butanethiol-sulfuric acid,
3-ethoxy-4[3-(p-butylphenylthio)-3-methyl-butyl]aminosulfolane,
3-methylamino-4(3-cyclopentylthio-2,2-diethyl-1,1-dimethylbutyl)aminosulfolane,
3-diethylamino-4(3-n-tolylthio-3-methylbutyl)amino-sulfolane,
4(3-amino-3,4-diethyl-2,5-dimethyl-1,1-dioxotetra-hydrothienyl) 4-(3,4-diethyl-2,5-dimethyl-1,1-dioxotetrahydrothienyl)disulfide,
bis 1-[3-(2,5-diethyl-3,4-dimethyl-1,1-dioxo-4-hydroxytetrahydrothienyl)]amino-1-propyl disulfide,
2-ethyl-3-N-[3-(1,1-dioxo-4-ethyl-2,2,5,5-tetramethyltetrahydrothienyl)]-N-methyl-aminobutyl 2-ethyl-3-N-[3-(1,1-dioxo-2,2,4,5,5-pentamethyl-4-ethyltetrahydrothienyl)]-N-methylaminobutyl sulfide, and the like.

Representative sulfolane or sulfolene reactants which can be used in this invention, and coming within the scope of one of said general Formulas II, III and IV, include:

4-chloro-3-aminosulfolane (4-chloro-3-amino-tetrahydrothiophene-1,1-dioxide),
4-bromo-3-(methylamino)sulfolane,
4-iodo-3-(N,N-dimethylamino)-sulfolane,
4-chloro-3-(N-methyl-N-ethylamino)sulfolane,
2,2,4-trimethyl-4-chloro-3-aminosulfolane,
3,4-dimethyl-4-chloro-3-aminosulfolane,
2,2-diethyl-4-bromo-3-(N-methylamino)sulfolane,
3-sulfolene,
3,4-diethyl-3-sulfolene,
2,5-dimethyl-3-sulfolene,
2,2,3,4,5,5-hexaethyl-3-sulfolene,
4-hydroxy-2-sulfolene,
4-methoxy-3,4-dimethyl-2-sulfolene,
2,5-diethyl-4-ethoxy-2-sulfolene, and the like.

Representative metal thiosulfates of the general formula $MS_2O_3$ or mercaptides of the general formula $M'SR_3$, which can be used in the reaction with any of the aforementioned halosulfolanes of general Formula II, include: aluminum thiosulfate, gallium thiosulfate, indium thiosulfate, calcium thiosulfate, strontium thiosulfate, barium thiosulfate, sodium thiosulfate, potassium thiosulfate, thallium thiosulfate, sodium methyl mercaptide, potassium ethyl mercaptide, rubidium isopropyl mercaptide, cesium tert-butyl mercaptide, lithium n-octyl mercaptide, sodium n-decyl mercaptide, potassium phenyl mercaptide, sodium naphthyl mercaptide, potassium p-tolyl mercaptide, sodium 4-n-butylphenyl mercaptide, potassium benzyl mercaptide, sodium 4-phenylbutyl mercaptide, potassium cyclopentyl mercaptide, sodium cyclohexyl mercaptide, sodium cyclooctyl mercaptide, lithium cyclodecyl mercaptide, sodium 2-methylcyclohexyl mercaptide, and the like.

Representative amino-substituted organic sulfides, and thiosulfuric acids thereof, coming within the scope of said general Formula V, which can be reacted with any of the aforementioned sulfolene compounds of said general Formulas III and IV, include:

N-(methylthioethyl)amine,
2-(ethylthio)ethylamine,
N-methyl-3-(n-decylthio)propylamine,
N-ethyl-2-ethyl-3-(benzylthio)pentylamine,
N-ethyl-1-(cyclohexylthio)propylamine,
N-methyl-1,1,2,2,3-pentamethyl-3-(p-tolylthio)butylamine,
2-(cyclooctylthio)ethylamine,
3-(4-butylphenylthio)propylamine,
2-benzylthioethylamine and the like.

The reaction conditions employed in this invention to form the novel sulfolane compounds of this invention can vary over wide ranges. Generally, satisfactory reaction temperatures will be in the range of 5 to 150° C., preferably 25 to 100° C. The pressure employed in the reaction can be the autogeneous pressure developed by the reaction mixture at the chosen reaction temperature, and such temperatures can be as high as 1000 to 1500 p.s.i.g. and even 2500 p.s.i.g. and higher. The reaction times will vary considerably, depending upon the reaction temperature and other variables, but generally will be in the range of 0.5 to 100 hours, and usually less than 10 hours. The mole ratio of the sulfolane or sulfolene reactant to the metal thiosulfate, mercaptide, or amino-substituted organic reactant can also vary widely but generally will be in the range of 0.5/1 to 2/1, preferably about 1/1. The reaction can be carried out batch-wise or in a continuous manner. The reaction can be carried out in suitable inert reaction diluents, such as water, methanol, chloroform, ether, dimethoxyethane, tetrahydrofuran, toluene, and the like. Where the reaction diluent is a polar compound, such as water, methanol, etc., the 3-amino-4-halosulfolanes, and their alkylated derivatives, and the amino-substituted organic sulfide reactants can be charged in the form of their acid salts, such as the hydrochloride or acetate salts, and neutralized in situ. The corresponding sulfolane products that result can be recovered in the form of salts by acidification or can be recovered as free bases.

After reaction is completed, the novel sulfolane compounds of this invention can be recovered by any suitable well-known means. For example, gases or vapors can be vented, recovered, and recycled, if desired, and the product separated by solvent extraction, fractional distillation, crystallization, and various other separation and recovery procedures to obtain the desired novel sulfolane compounds.

The novel or sulfolane compounds of this invention are useful for a number of purposes, such as pesticides (including contact insecticides), selective solvents for hydrocarbons, organic intermediates and pharmaceuticals (such as anti-radiation drugs). In the event that $R_3$ of general Formula I is a hydrogen, such compound can be converted to a disulfide compound by oxidation with an oxidizing agent such as air, oxygen, hydrogen peroxide, peracids, elemental halogens, etc. If $R_3$ is a benzyl radical, the sulfolane compound can be converted to a mercaptan (where $R_3$ is a hydrogen) by cleavage, e.g., by treatment with sodium or potassium in liquid ammonia, and subsequently treated with such an oxidizing agent to obtain the corresponding disulfide.

The following examples serve to illustrate the objects and advantages of this invention, but the various reactions, conditions, and other details recited in these examples should not be construed so as to unduly limit this invention.

*Example I*

3-amino-4-sulfolanethiolsulfuric acid was prepared as follows:

A mixture of 18.8 g. of 3-amino-4-chlorosulfolane hydrochloride and 47.5 g. of thallium thiosulfate in 100 ml. of distilled water was vigorously stirred at 65° C. for 16 hr., and then filtered while hot. The resulting yellow filtrate was evaporated on a rotary evaporator under aspirator pressure. The resulting crystalline residue was teated with 40 ml. of distilled water at room temperature and the mixture filtered to remove a small amount of insoluble material. The resulting filtrate was chilled to −10° C., yielding 5.5 g. of crystalline solid. This solid was recrystallized from 20 ml. of hot water to yield small white crystals having a melting point of 211° C. (with decomposition) and was established by elemental analysis and infrared spectra as 3-amino-4-sulfolanethiolsulfuric acid.

*Example II*

3-amino-4-benzylthiosulfolane hydrochloride was prepared as follows:

A solution of 12.4 g. of benzyl mercaptan and 8.0 g. of sodium hydroxide (acid scavenger) in 125 ml. of methanol was mixed under nitrogen with 20.6 g. of 3-amino-4-chlorosulfolane hydrochloride. The mixture was stirred under reflux (65° C.) for 2 hr. and was then diluted with 250 ml. of water. The oil formed upon such dilution was separated and the resulting aqueous residue was extracted three times with chloroform. The chloroform extracts were combined with the separated oil and the resulting solution was washed twice with water and the chloroform was evaporated. The resulting oil obtained after such evaporation was mixed with 25 ml. of concentrated hydrochloric acid and evaporated again. The resulting residue was dissolved in isopropyl alcohol and, after cooling, the mixture was filtered. The resulting filtrate was evaporated and the resulting residue, amounting to 13.5 g., was recrystallized five times from acetonitrile to yield fine white crystals having a melting point of 165–167° C. and established by elemental analysis as 3-amino-4-benzylthiosulfolane hydrochloride.

*Example III*

The hydrochloride of 3-(2-benzylthioethylamino)sulfolane was prepared as follows:

A mixture of 65 g. of 2-benzylthioethylamine, 29.5 g. of 3-sulfolene, and 1 g. of powdered potassium hydroxide catalyst was shaken for 72 hr. at 70° C. After cooling the mixture, it was taken up in a mixture of ether and chloroform and washed with water. Eighty-two g. of an orange oil was recovered from the mixture and was stripped at 0.2 mm. Hg absolute pressure on a steam bath for several hours, resulting in the removal of 43.3 g. of unreacted 2-benzylthioethylamine. The resulting residue, amounting to 37 g., was dissolved in chloroform, and the resulting solution was then saturated with anhydrous hydrochloric acid. Thirty-one g. of a tan, amorphous solid was collected and recrystallized twice from alcohol to yield a white powder having a melting point of 195 to 196° C. and established by elemental analysis as 3-(2-benzylthioethylamino)sulfolane hydrochloride.

*Example IV*

The hydrochloride of 3-(2-benzylthioethylamino)-4-hydroxy sulfolane was prepared as follows:

A solution of 34 g. of 2-benzylthioethylamine and 27 g. of 4-hydroxy-2-sulfolene in 150 ml. of dimethoxyethane was allowed to stand at room temperature for 36 hr. The mixture was then heated at 70° C. for 8 hr. and finally under reflux for 4 hr. The dimethoxyethane solvent was then distilled from the resulting deep red solution and the remaining residue was dissolved in isopropyl alcohol. The resulting solution was then acidified with hydrochloric acid, yielding 29 g. of a white solid having a melting point of 193–196° C. This solid was recrystallized from a methanol-isopropyl alcohol mixture to give a solid having a melting point of 204–205° C. and established by elemental analysis as 3-(2-benzylthioethylamino)-4-hydroxysulfolane hydrochloride.

*Example V*

Bis[2 - N - (1,1 - dioxo-3 - hydroxytetrahydrothienyl)-amino-ethyl]disulfide dihydrochloride was prepared as follows:

Small pieces of sodium were added, while stirring, to a solution of 20 g. of 3-(2-benzylthioethylamino)-4-hydroxy sulfolane hydrochloride (prepared in Example IV) in 500 ml. of liquid ammonia. Addition of the sodium caused a blue color and this color was allowed to fade before the next addition of sodium was made. After 6.6 g. of sodium had been thus added, the blue color persisted for 1 hr. At this time, 16 g. of ammonium chloride was added, after which the ammonia was evaporated. The residue was immediately placed under an atmosphere of nitrogen and heated under reflux with 300 ml. of absolute ethanol. The mixture was filtered while hot. The solid recovered from the mixture was again boiled with 200 ml. of methanol and again filtered while hot. The alcoholic solutions were combined and cooled, and the small amount of precipitated solid which appeared was filtered off and discarded. The resulting filtrate was evaporated to dryness and the resulting residue was triturated once with a hot mixture of methanol and chloroform and once with a hot mixture of ethanol and benzene, filtering out the insoluble solids each time, and the solvents evaporated. The resulting residue was then treated with 15 ml. of concentrated hydrochloric acid. The mixture was heated under reflux with 200 ml. of absolute methanol and filtered cold to yield 4.5 g. of off-white crystals having a melting point of 242–244° C. These crystals were insoluble in cold alcohols, difficultly soluble in cold water, and very soluble in hot water. The crystals were recrystallized twice from dilute methanol to yield an ivory colored powder having a melting point of 246–247° C. (with decomposition) and established by elemental analysis and infrared spectra as bis[2 - N-(1,1-dioxo-3-hydroxytetrahydrothienyl)-amino-ethyl]disulfide dihydrochloride.

Various modifications and alterations of this invention will become apparent to those skilled in the art from the foregoing description without departing from the scope and spirit of this invention, and it is to be understood that the examples set forth herein for illustrative purposes should not be construed to unduly limit this invention.

I claim:
1. 3-amino-4-sulfolanethiosulfuric acid.
2. 3-amino-4-benzylthiosulfolane.
3. 3-(2-benzylthioethylamino)sulfolane.
4. 3-(2-benzylthioethylamino)-4-hydroxysulfolane.
5. Bis{2-N[4-(1,1 - dioxyl - 3 - hydroxytetrahydrothienyl)]-aminoethyl}-disulfide dihydrochloride.

References Cited

UNITED STATES PATENTS 3,098,793  7/1963  Loev _____ 167—82

OTHER REFERENCES

Wagner et al., Synthetic Organic Chemistry, Wiley and Sons, London (1953), p. 787.

Lowy et al., An Introduction to Organic Chemistry, John Wiley and Sons, New York (1945), pp. 213–215.

WALTER A. MODANCE, *Primary Examiner.*

JOHN D. RANDOLPH, JAMES A. PATTEN,
*Examiners.*